J. LINTON.
DISH WASHER.
APPLICATION FILED SEPT. 8, 1917.
1,354,049.
Patented Sept. 28, 1920.
3 SHEETS—SHEET 1.
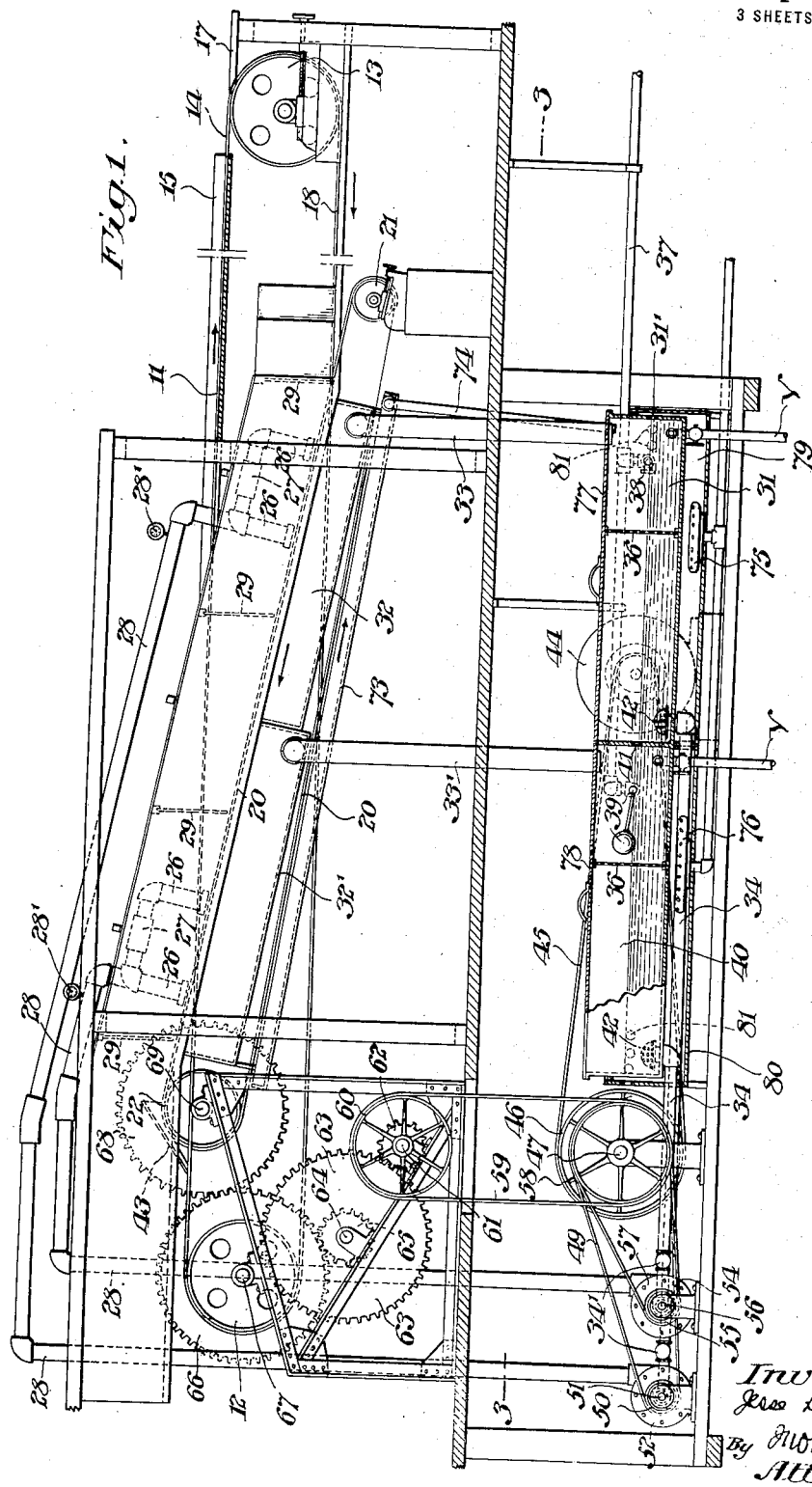

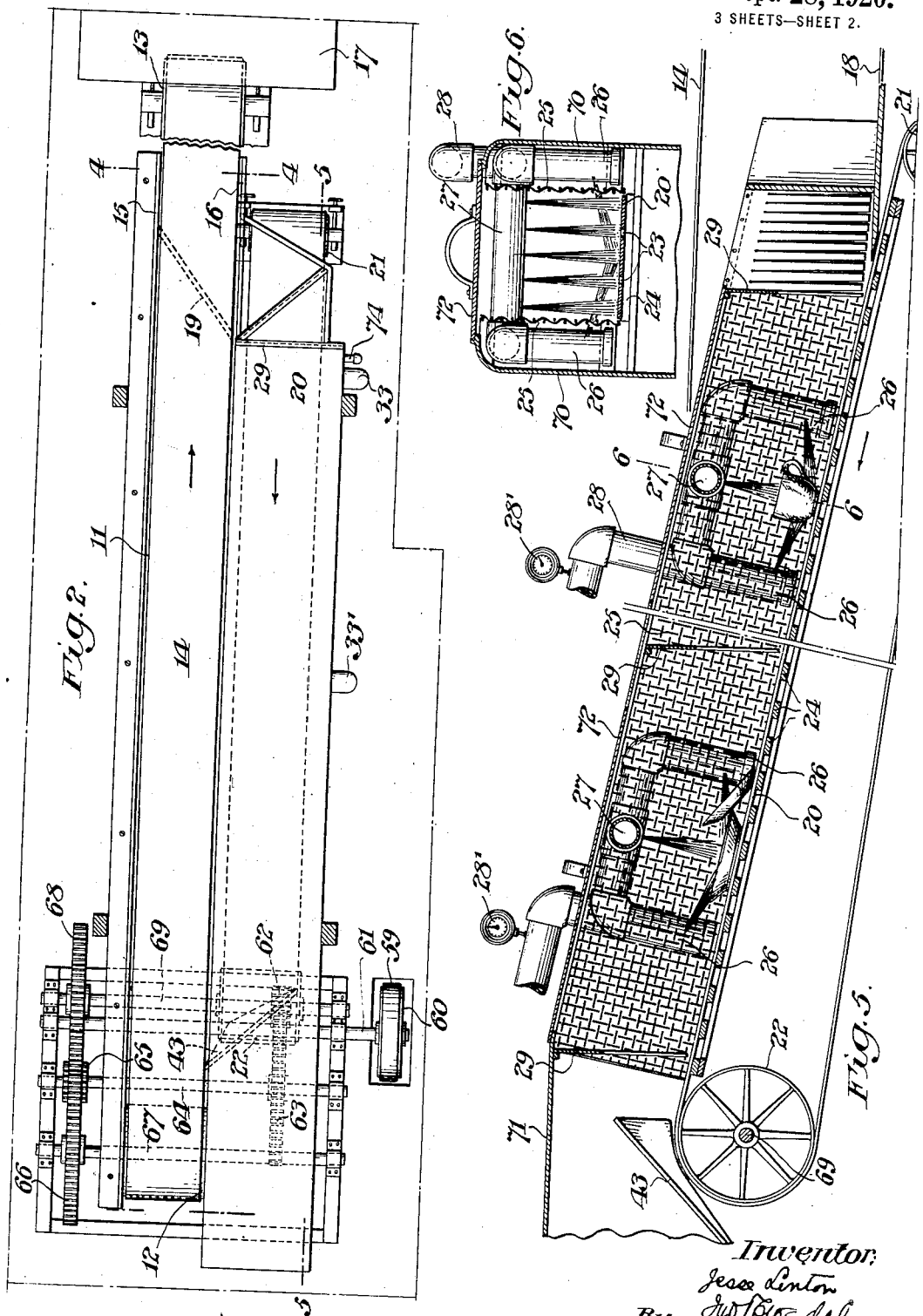

J. LINTON.
DISH WASHER.
APPLICATION FILED SEPT. 8, 1917.
1,354,049.
Patented Sept. 28, 1920.
3 SHEETS—SHEET 3.
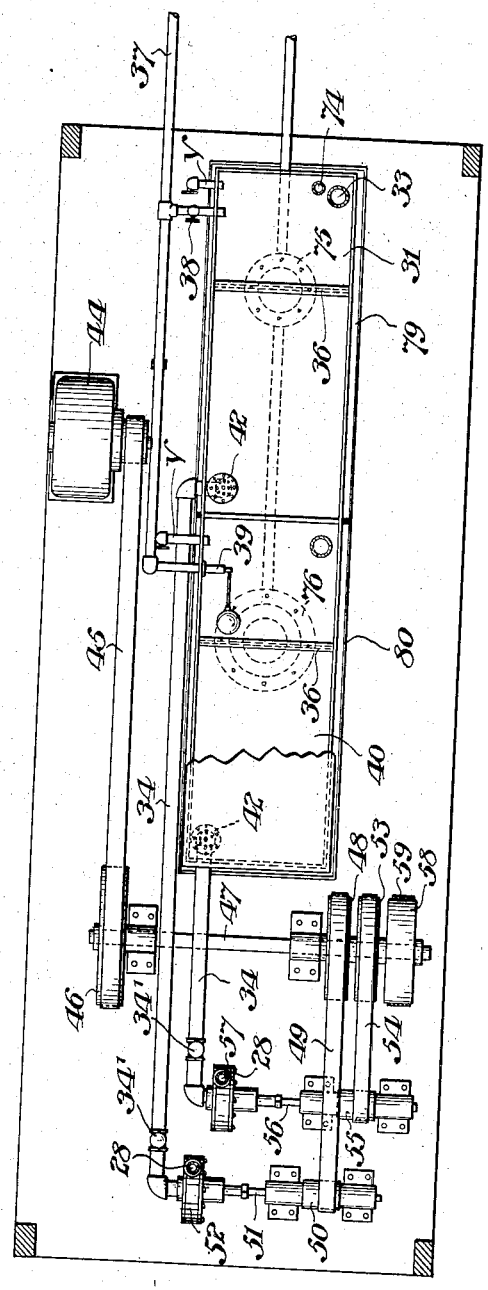
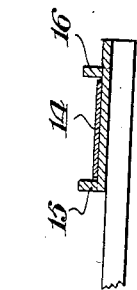
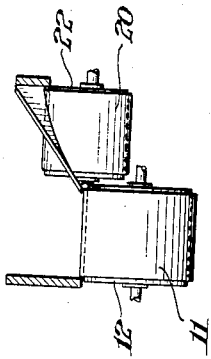
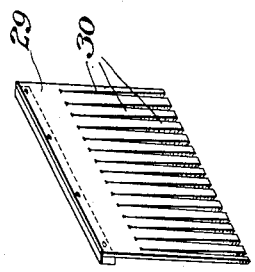
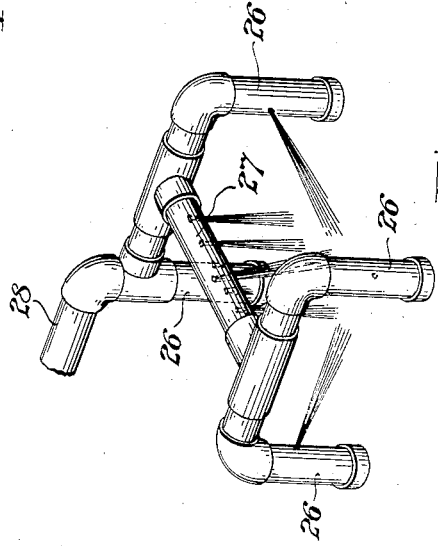
Inventor:
Jesse Linton
By Jno Cowzdal,
Attorney.

UNITED STATES PATENT OFFICE.

JESSE LINTON, OF PHILADELPHIA, PENNSYLVANIA.

DISH-WASHER.

1,354,049.

Specification of Letters Patent.   Patented Sept. 28, 1920.

Application filed September 8, 1917.   Serial No. 190,282.

*To all whom it may concern:*

Be it known that I, JESSE LINTON, a citizen of the United States, residing at Philadelphia, in the county of Philadelphia, State of Pennsylvania, have invented a new and useful Dish-Washer, of which the following is a specification.

My invention relates to improvements in dish washing. The object is to provide improved method and means for automatically washing dishes and similar utensils.

The invention comprises suitable means for conveying the dishes to a point where they are subjected to the action of streams of hot soapy water, acting upon the dishes with substantial force and in opposite directions; for then conveying the dishes to another point where the same are subjected to the action of hot rinsing water similarly directed; method and means whereby the hot soapy water after acting upon the dishes is conveyed to a suitable receptacle where the foreign substance washed from the dishes is separated from the soapy water, and from whence the soapy water is again taken and carried back to act upon new lots of dishes, automatically conveyed into and beyond the influence of same; method and means for conveying the rinsing water which has acted upon the dishes to a suitable receptacle whence it is again pumped to act upon fresh lots of dishes; method and means for carrying off the surface water from the rinsing water tank; method and means whereby the dishes are automatically carried through streams of hot soapy water on a conveyer, having openings for permitting the water and particles of food and other foreign matter to pass therethrough, as the same is washed from the dishes, then through the hot rinsing water and then to a conveying belt for carrying the dishes to the point or points required.

My invention also comprises improvements in details of construction.

Referring to the drawings which illustrate merely by way of example suitable means for the embodiment of my invention—

Figure 1 is a side elevation in part section.

Fig. 2 is a plan view.

Fig. 3 is a section on the line 3—3 of Fig. 1.

Fig. 4 is a cross section on line 4—4 of Fig. 2 on an enlarged scale.

Fig. 5 is a longitudinal section on line 5—5 of Fig. 2, on an enlarged scale.

Fig. 6 is a vertical cross section on line 6—6 of Fig. 5.

Fig. 7 is a perspective view of the spraying piping.

Fig. 8 is a perspective view of a curtain or baffle.

Fig. 9 is a sectional elevation on line 9—9 of Fig. 2.

Similar numerals refer to similar parts throughout the several views.

Referring especially to Fig. 1, the conveyer belt 11 is carried on the drums or pulleys 12 and 13, and may be of any required length so as to pass one or more points of service. The upper surface 14 of this belt 11, is adapted to carry clean dishes from a point where the dishes are delivered thereto from the cleaning means, to a point or points where they are to be used for receiving or serving food. The said upper surface 14 of this belt runs between the guards 15 and 16, see Fig. 4, to prevent accidental displacement of the dishes from said conveyer belt. The horizontal table 17 is provided at the same level with the upper surface 14 of conveyer belt 11 and serves to receive any of the dishes which may not have been removed from said belt before the belt reaches the pulley 13.

The inner surface 18 of the conveyer belt 11, which constitutes the upper side of the lower extension of said conveyer belt, is adapted to receive the used or unwashed dishes, which are then carried by the moving conveyer belt in the direction of the arrow against the deflector 19, which deflector serves to push the dishes from the conveyer surface 18 onto the conveyer belt 20. This belt 20 is maintained in an upwardly inclined position on the pulleys 21 and 22 and moves in the direction of the arrow, see Fig. 1. This conveyer belt 20 is provided with a number of openings 23 as shown in Fig. 5. This conveyer belt 20 is supported on the rails 24 which lie beneath the same, and moves between the vertically extending flanking walls of wire mesh 25.

At suitable points along the extension of conveyer belt 20 are provided high pressure stream ejector devices comprising vertical pipe elements 26 and horizontal pipe elements 27 connected with the supply pipe 28, as clearly shown in Fig. 7. The vertical pipe elements are arranged to flank the vertical wire mesh walls 25 and are provided with apertures adapted to deliver convergent streams of water slightly inclined to the horizontal, while the horizontal pipe element 27 is provided with apertures adapted to direct substantially vertical streams of water to the belt. Each ejector element is provided with water by means of a pump or other suitable device, from a reservoir or reservoirs or other source of supply. The reservoir 31 is adapted to receive the water which has been ejected against the dishes and collected in pan 32 and carried therefrom by pipe 33 to said reservoir 31. The water is conducted from reservoir 31 through pipe 34 to pump 52 and thence through pipe 28 to said ejector element 26, 27. Non-return or check valves 34' are provided in the piping system connecting the ejector elements with the source of supply, in order to keep the system primed. Pressure gages 28' are provided in the piping systems, see Fig. 5. Reservoir 31 is preferably provided with a screen or partition 36 of wire mesh or other suitable straining or filtering device interposed between the intake from return pipe 33 and the point of discharge to service pipe 34. A similar screen 36 is preferably provided in tank 40.

Any desired number of ejecting elements may be used. In the present example only two are shown. As the structure of each is identical with that of the other, as to the arrangement and method of circulating the water to and from the same, a description of one such arrangement will suffice for both; the one difference being in the nature or characteristic of the water used in each.

On each side of a stream ejector element is provided the curtain or baffle 29 of yielding material such as rubber. This baffle 29 is preferably formed, as shown in Fig. 8, with a number of downwardly extending fingers 30 with very narrow slits therebetween.

It is also desirable to provide two baffles between the two ejector elements to prevent the splashing of the water from one ejector element into the compartment of the other ejector element.

A supply pipe 37 is provided for replenishing the tanks 31 and 40. The hand valve 38 is arbitrarily controlled, while valve 39 is automatically controlled by the float valve adjusted to maintain the level in reservoir 40 slightly above the overflow opening 41. Reservoir 31 is provided with an overflow opening 31' slightly lower than opening 41. This opening 31' is connected with the sewer. Each reservoir is provided near the bottom thereof with a hand operated valve controlled discharge pipe V for cleaning. Strainer caps 42 are also used over the intake openings of the service pipes 34 leading from tanks 31 and 40 to pumps 52 and 57. Gas burners 75 and 76 are provided beneath the reservoirs 31 and 40 to maintain the water at the required temperature therein. The larger burner is placed beneath reservoir 40 in order to keep the rinsing water hotter than the soapy water. These reservoirs are provided with covers 77 and 78. The reservoirs and burners are also surrounded by the jackets 79 and 80, for conserving the heat, but are provided with vents 81 at about the normal water level. The screens or filters 36 are made removable and may be lifted from the reservoirs to be cleaned.

At the left hand end of conveyer belt 20, approximate the point where the same engages the pulley 22, is provided another deflecting device 43, in the nature of a chute, for carrying or transferring the dishes from said conveyer belt 20 over to and upon the surface of the upper extension 14 of conveyer belt 11. This deflector or chute is adapted to tilt or turn the dishes over in the transferring operation.

The motor 44 may be of any suitable form. In the example illustrated, it is an electric motor. This is connected by the belt 45 with the pulley 46 mounted on the countershaft 47. This countershaft 47 carries the pulley 48 which is connected by belt 49 with pulley 50 on shaft 51 of centrifugal pump 52. On shaft 47 is also mounted the pulley 53 connected by belt 54 with pulley 55 on shaft 56 of centrifugal pump 57. Countershaft 47 also carries pulley 58 which is connected by belt 59 with pulley 60 on shaft 61, carrying pinion 62 which meshes with gear wheel 63 on shaft 64 carrying pinion 65 which meshes with gear wheel 66 mounted on shaft 67 carrying pulley 12 which supports and drives the horizontal conveyer belt 11. Gear wheel 66 also meshes with gear wheel 68 on shaft 69 carrying pulley 22 which supports and drives the inclined conveyer belt 20.

It will also be noted that the space in which the dishes are subjected to the washing and rinsing operation is shown as inclosed by the vertical side walls 70 and top wall 71, and the movable portions or covers 72, as clearly shown in Figs. 5 and 6.

The operation of my device is as follows:
The dishes to be washed are placed upon the conveyer surface 18 of the conveyer belt 11, the belt moving in the direction of the arrow, see Figs. 1 and 2. The moving dishes engage the deflector wall 19 and are pushed over onto conveyer belt 20 and are carried by said conveyer belt 20 past the baffle or curtain 29, upwardly between the wire mesh walls 25, and between and beneath the pipe sections 26 and 27 of the ejector elements, so as to come within the influences of the converging streams directed thereby. It will be noted that some of these streams are substantially vertical issuing from vents directly over the conveyer belt, while the other streams are approximately horizontal or slightly inclined to the horizontal, issuing from vents flanking the conveyer belt and slightly above the plane thereof, so that all sides or surfaces of the dishes are directly impinged by the streams.

In the present example the first ejector element is supplied from reservoir 31, containing hot soapy water. The said water ejected upon the dishes passes, with the material, through the openings 23 into the trough 32, and from this trough 32 it is carried by pipe 33 to the reservoir 31. From reservoir 31 it is carried by pipe 34 to pump 52 and thence through pipe 28 to said ejector devices. It will also be noted that the water, passing in the reservoir from pipe 33 to pipe 34 is screened or filtered by the filtering partition 36, so that all solid materials are separated from the soapy water before the same is passed back to the ejector devices.

The passing of the dishes through the soapy water serves to cleanse the same from all foreign materials. The baffles or curtains 29 serve to prevent the splashing of the water from one compartment to another.

In another compartment, farther on, is provided another ejecting device similar to that last described but supplied with clean water. This serves to rinse the soapy water from the dishes and complete the cleaning process.

By providing the overflow opening 41 in reservoir 40, and the float valve 39 adjusted so as to maintain the supply of water in reservoir 40 slightly above the opening 41, the surface water in reservoir 40 flows continuously from said reservoir through aperture 41 into reservoir 31, and carries with it any grease or other substances which rise to the top of the water in reservoir 40. This tends to maintain the water in 40 clean.

The overflow aperture 31' in reservoir 31 is slightly below the level of aperture 41, so that the level of the water in reservoir 31 is maintained below the level of water in reservoir 40, and, as above stated there will be a constant flow from reservoir 40 into reservoir 31. There will also be a constant flow of the surface water from reservoir 31 through aperture 31' and a proper conductor connected therewith to the sewer, thus carrying away the grease and other foreign substances rising to the top of the water in reservoir 31. This tends to maintain the soapy water in reservoir 31, cleaner than would otherwise be the case.

Each reservoir is also provided, near the bottom thereof, with a hand operated valve controlled clean-out pipe V for removing from time to time the accumulation of foreign substances carried from the dishes thereto.

As the dishes progress with the conveyer beyond the rinsing chamber they are finally delivered from the conveyer 20 near the pulley 22 by means of the chute 43, to the upper surface 14 of the conveyer belt 11.

As above stated the chute or deflector 43 is arranged to tilt or turn over the dishes as they are delivered to conveyer belt 11 which serves to empty therefrom any water that may have lodged therein.

This conveyer belt 11 may deliver to a point where the plates are to be furnished or supplied with food, and then may continue to deliver the plates to the point where the waiter serves the customer.

It should also be noted that it is usually desirable to place beneath the lower extension of the conveyer belt 20, that is under the entire conveyer belt 20, the pan 73 for receiving the drip from said belt. This pan is drained by the pipe 74 delivering to reservoir 31.

What I claim is:—

1. In a dish washing machine, the combination of two conveyer belts running side by side, one in a horizontal plane, the other inclined to the horizontal, means for automatically transferring the dishes from the horizontal belt to the inclined belt, means, in the path of travel of the inclined belt for ejecting streams of water from above and from points flanking the belt and means beyond the ejecting means for automatically transferring the dishes from the inclined belt to the horizontal belt.

2. In a dish washing machine, the combination of means for automatically carrying dishes from a charging point to a discharging point including two conveyer belts and means for automatically transferring dishes from the first belt to the second belt and then at a required interval back to the first belt, and stream ejector devices operating upon the dishes while in transit for washing and rinsing same.

JESSE LINTON.